US010897795B2

(12) United States Patent
Kanai et al.

(10) Patent No.: US 10,897,795 B2
(45) Date of Patent: Jan. 19, 2021

(54) INDUCTION HEATING POWER SUPPLY APPARATUS

(71) Applicant: NETUREN CO., LTD., Tokyo (JP)

(72) Inventors: Takahiko Kanai, Tokyo (JP); Masato Sugimoto, Tokyo (JP); Haruki Yoshida, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 235 days.

(21) Appl. No.: 16/064,246

(22) PCT Filed: Dec. 22, 2016

(86) PCT No.: PCT/JP2016/005217
§ 371 (c)(1),
(2) Date: Jun. 20, 2018

(87) PCT Pub. No.: WO2017/110095
PCT Pub. Date: Jun. 29, 2017

(65) Prior Publication Data
US 2019/0008002 A1    Jan. 3, 2019

(30) Foreign Application Priority Data
Dec. 24, 2015    (JP) .................................. 2015-251890

(51) Int. Cl.
*H05B 6/06*    (2006.01)
*H02M 7/00*    (2006.01)
(Continued)

(52) U.S. Cl.
CPC ............ *H05B 6/06* (2013.01); *H02M 5/4585* (2013.01); *H02M 7/003* (2013.01); *H05B 6/04* (2013.01);
(Continued)

(58) Field of Classification Search
CPC ........ H05B 6/06; H05B 6/101; H02M 5/4585; H02M 7/003; H02M 7/493
(Continued)

(56) References Cited

U.S. PATENT DOCUMENTS 5,132,896 A * 7/1992 Nishizawa ............ H02M 7/003
363/144
6,028,779 A * 2/2000 Sakamoto ............ H02M 7/003
363/55
(Continued)

FOREIGN PATENT DOCUMENTS

EP    1 848 072    10/2007
EP    2 099 121    9/2009
(Continued)

OTHER PUBLICATIONS

International Search Report and Written Opinion of the International Searching Authority, dated Mar. 31, 2017 in corresponding International Patent Application No. PCT/JP2016/005217.

*Primary Examiner* — Thien S Tran
(74) *Attorney, Agent, or Firm* — Wenderoth, Lind & Ponack, L.L.P.

(57) ABSTRACT

An induction heating power supply apparatus includes a smoothing section to smooth DC power and an inverter section to convert the smoothed DC power into AC power. The inverter section has first and second modules, each having serially connected switching devices. Output bus bars are interposed between the first and second modules. The smoothing section has first bus bars connected to a DC power supply section and the first module, a capacitor connected to the first bus bars, second bus bars connected to the DC power supply section and the second module, and another capacitor connected to the second bus bars. The first and second bus bars extend parallel to the output bus bars. The first module is interposed between the first bus bars and
(Continued)

the output bus bars. The second module is interposed between the second bus bars and the output bus bars.

3 Claims, 14 Drawing Sheets

(51) Int. Cl.
*H05B 6/04* (2006.01)
*H02M 5/458* (2006.01)
*H05B 6/10* (2006.01)
*H02M 7/493* (2007.01)
*H05K 7/14* (2006.01)

(52) U.S. Cl.
CPC ............ *H05B 6/101* (2013.01); *H02M 7/493* (2013.01); *H05K 7/1432* (2013.01)

(58) Field of Classification Search
USPC .................... 219/665; 363/55, 132, 144, 147
See application file for complete search history.

(56) References Cited

U.S. PATENT DOCUMENTS

| | | | |
|---|---|---|---|
| 6,124,581 A * | 9/2000 | Ulrich ...................... | H05B 6/08 219/626 |
| 6,493,249 B2 * | 12/2002 | Shirakawa ............ | H02M 7/003 363/147 |
| 2003/0016724 A1 * | 1/2003 | Fishman .................. | H05B 6/30 373/146 |
| 2007/0051974 A1 * | 3/2007 | Azuma ................... | H01L 24/41 257/177 |
| 2014/0119087 A1 * | 5/2014 | Matsuoka ............. | H02M 7/003 363/132 |

FOREIGN PATENT DOCUMENTS

| | | |
|---|---|---|
| EP | 2 555 407 | 2/2013 |
| GB | 2 214 731 | 9/1989 |
| GB | 2 242 580 | 10/1991 |
| JP | 2009-277577 | 11/2009 |

* cited by examiner

INDUCTION HEATING POWER SUPPLY APPARATUS

TECHNICAL FIELD

The present invention relates to an induction heating power supply apparatus.

BACKGROUND ART

Induction heating is used as a workpiece heating, method in heat treatment of a workpiece made of steel. In the induction heating, AC power is supplied to a heating coil, and a workpiece placed in a magnetic field formed by the heating coil is heated by current induced in the workpiece.

A power supply device for supplying AC power to the heating coil generally converts AC power of a commercial power supply into DC power by a converter, smoothes a pulsating current of the DC power by a capacitor, converts the smoothed DC power into AC power by an inverter, and generates high frequency AC power to be supplied to the heating coil (see, e.g., JP2009-277577A).

The inverter is typically configured as a full bridge circuit including a pair of arms in each of which two power semiconductor devices capable of performing switching operation are connected in series so that high frequency AC power can be generated by high speed switching operation of the power semiconductor devices.

There is a case where a plurality of bridges are provided in parallel with one another in a power supply device used for high power application such as heat treatment of a workpiece made of steel. Power semiconductor devices or arms are formed into modules. Connection of the modules is however complicated due to an increase of the bridges, which may make the maintenance of the power supply device troublesome.

SUMMARY

Illustrative aspects of the present invention provide an easy maintenance induction heating power supply apparatus.

According to an aspect of the present invention, an induction heating power supply apparatus includes a smoothing section configured to smooth a pulsating current of DC power that has been output from a DC power supply section, an inverter section configured to convert the DC power smoothed by the smoothing section into AC power, and an output section configured to output the AC power into which the DC power has been converted by the inverter section. The output section has a pair of output bus bars. The inverter section has at least one bridge. The bridge has a first module and a second module. Each of the first module and the second module has two switching devices connected to each other in series. The pair of output bus bars is interposed between the first module and the second module of the bridge such that an output portion of the first module is connected to one of the output bus bars and an output portion of the second module is connected to the other output bus bar. The smoothing section has a pair of first bus bars to be connected to an output portion of the DC power supply section and an input portion of the first module, at least one capacitor connected to the pair of first bus bars, a pair of second bus bars to be connected to the output portion of the DC power supply section and an input portion of the second module, and at least one capacitor connected to the pair of second bus bars. The pair of first bus bars extends in parallel with the pair of output bus bars and is disposed such that the first module is interposed between the pair of first bus bars and the pair of output bus bars. The pair of second bus bars extends in parallel with the pair of output bus bars and is disposed such that the second module is interposed between the pair of second bus bars and the pair of output bus bars.

DESCRIPTION OF EMBODIMENT

Figure 1:
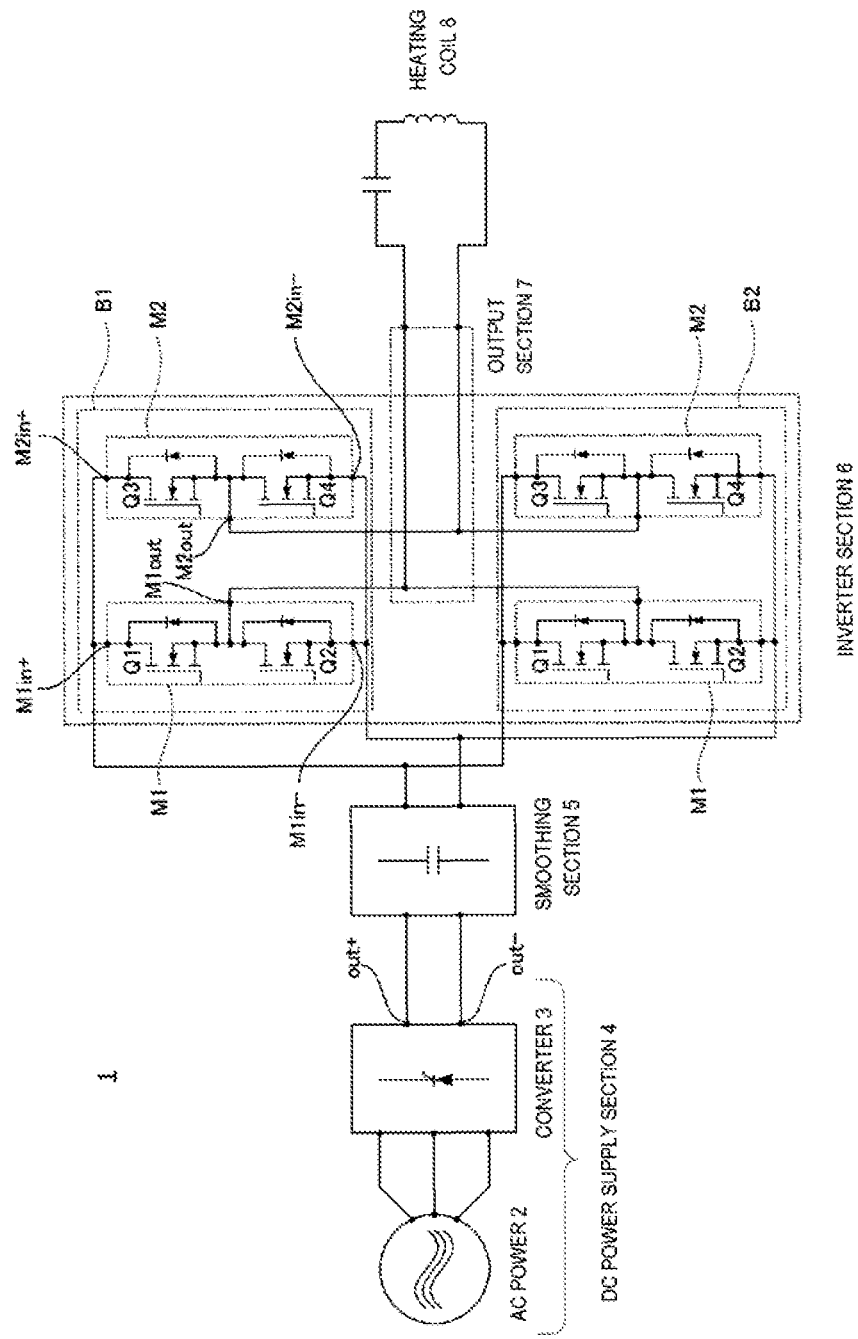
FIG. 1 is a circuit diagram of an example of an induction heating power supply apparatus according to an embodiment of the present invention.

FIG. 1 illustrates an example of an induction heating power supply apparatus 1 according to an embodiment of the present invention.

The induction heating power supply apparatus 1 includes a DC power supply section 4, a smoothing section 5, an inverter section 6, and an output section 7. The DC power supply section 4 includes a converter 3 configured to convert AC power supplied from a commercial AC power supply 2 into DC power. The smoothing section 5 is configured to smooth a pulsating current of the DC power output from the DC power supply section 4. The inverter section 6 is configured to convert the DC power that has been smoothed by the smoothing section 5 into high frequency AC power. The output section 7 is configured to output the AC power into which the DC power has been convened by the inverter section 6 to a heating coil 8.

The inverter section 6 includes at last one bridge circuit having a plurality of arms in each of which two power semiconductor devices capable of performing switching operation are connected in series. In the illustrated example, two bridge circuits of a first bridge B1 and a second bridge B2 are provided in the inverter section 6. The first bridge B1 and the second bridge B2 are connected in parallel with the heating coil 6 through the output section 7. The supply of electric power to the heating coil 8 is distributed to the first bridge B1 and the second bridge B2.

The first bridge B1 is configured as a full bridge circuit which has an arm including power semiconductor devices Q1, Q2 connected in series, and an arm including power semiconductor devices Q3, Q4 likewise connected in series, and in which a series connection point between the power semiconductor devices of each of the arms is used as an output terminal.

The second bridge B2 is likewise configured as a full bridge circuit which has an arm including power semiconductor devices Q1, Q2 connected in series, and an arm including power semiconductor devices Q3, Q4 likewise connected in series, and in which a series connection point between the power semiconductor devices of each of the arms is used as an output terminal.

Various power semiconductor devices capable of performing switching operation, such as an insulated gate bipolar transistor (IGBT) and an metal-oxide-semiconductor field-effect transistor (MOSFET) can be used as each of the power semiconductor devices Q1 to Q4, For example, Si (silicon) and SiC (silicon carbide) may be used as the material of the power semiconductor device.

Each of the first bridge B1 and the second bridge B2 is formed into a first module M1 and a second module M2 correspondingly to the arms respectively. The first module M1 includes the power semiconductor devices Q1, Q2. The second module M2 includes the power semiconductor devices Q3, Q4.

Figure 2:
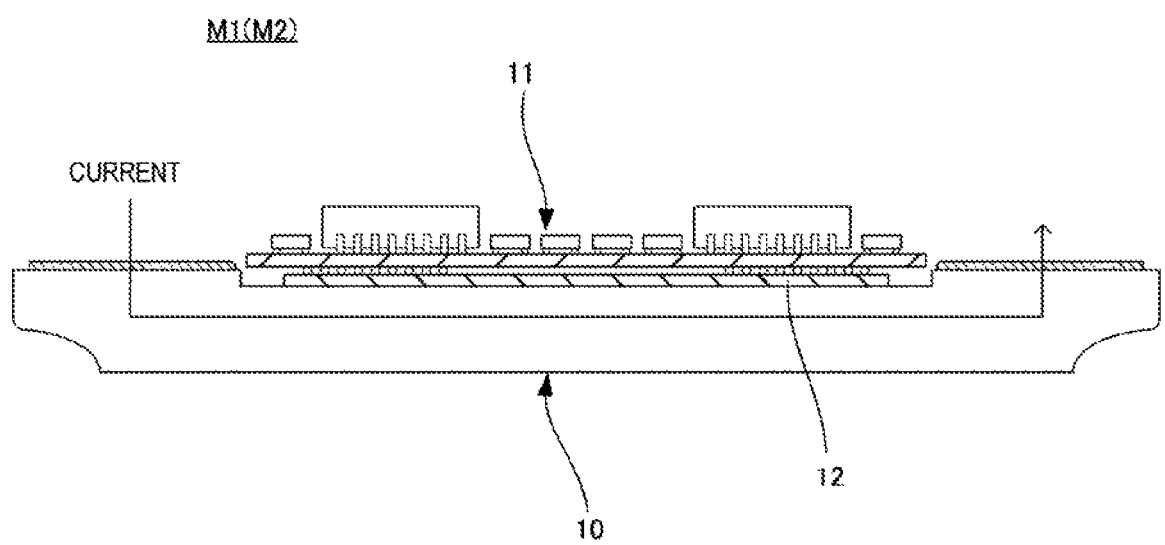
FIG. 2 is a side view of an example of a module of an inverter section of the induction heating power supply apparatus.

FIG. 2 illustrates an example of the module M1 or M2.

The first module M1 has a module body 10 and a driver board 11. The power semiconductor devices Q1, Q2 are mounted on the module body 10. The power semiconductor devices Q1, Q2 are operated for switching by the driver board 11. The driver board 11 is overlaid on the module body 10. A shielding plate 12 is interposed between the module body 10 and the driver board 11 so that the shielding plate 12 can shield the driver board 11 from noise which is radiated from the module body 10 due to a high frequency current flowing into the module body 10. The second module M2 is likewise configured such that a driver board is overlaid on a module body with a shielding plate being interposed therebetween.

By placing the driver board 11 on top of the module body 10, the size (space) of the inverter section 6 can be reduced (saved).

Figure 3:
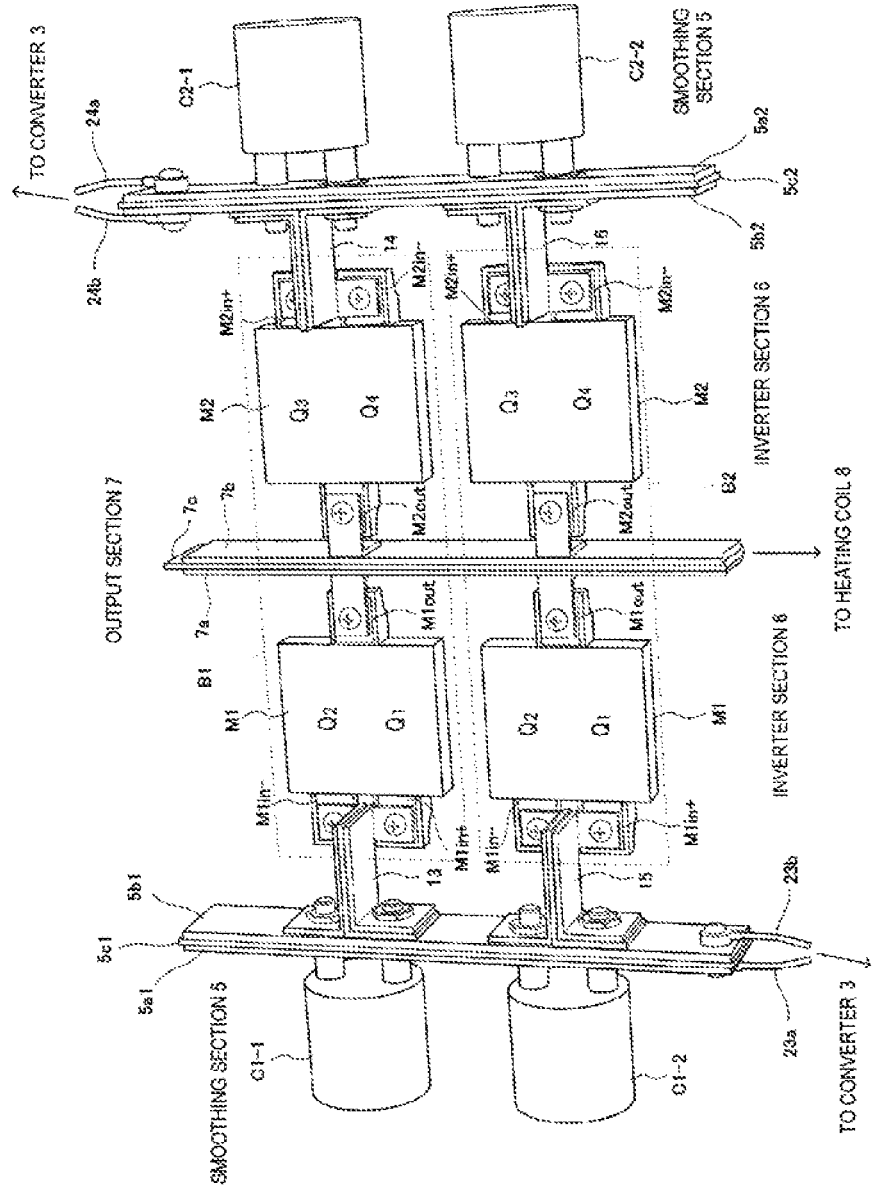
FIG. 3 is a perspective view of examples of a smoothing section, an inverter section and an output section of the induction heating power supply apparatus.

FIG. 3 illustrates examples of the smoothing section 5, the inverter section 6 and the output section 7.

The output section 7 has a pair of output bus bars 7a, 7b exte7a, 7b tiding in parallel with each other. Each of the output bus bars 7a, 7b is formed into a plate shape. The output bus bars 7a, 7b are laminated on each other with the interposition of a sheet-like insulating member 7c between plate faces of the output bus bars 7a, 7b.

The first module M1 including the power semiconductor devices Q1, Q2 and the second module M2 including the power semiconductor devices Q3, Q4 in the first bridge B1 are provided to be opposed to each other with respect to the output bus bars 7a, 7b. The first module M1 is disposed on the output bus bar 7a side. The second module M2 is disposed on the output bus bar 7b side.

The first module M1 including the power semiconductor devices Q1, Q2 and the second module M2 including the power semiconductor devices Q3, Q4 in the second bridge B2 are provided to be opposed to each other with respect to the output bus bars 7a, 7b. The first module M1 is disposed on the output bus bar 7a side. The second module M2 is disposed on the output bus bar 7b side.

The first module M1 of the first bridge B1 and the first module M1 of the second bridge B2 are disposed side by side along the output bus bar 7a. The second module M2 of the first bridge B1 and the second module M2 of the second bridge B2 are disposed side by side along the output bus bar 7b.

The smoothing section 5 has a pair of first bus bars 5a1, 5b1, capacitors connected to the first bus bars 5a1, 5b1, a pair of second bus bars 5a2, 5b2, and capacitors connected to the second bus bars 5a2, 5b2.

The first bus bars 5a1, 5b1 extend in parallel with the output bus bars 7a, 7b. The first bus bars 5a1, 5b1 are disposed so that the first module of the first bridge B1 and the first module M1 of the second bridge B2 arranged side by side along the output bus bar 7a can be interposed between the first bus bars 5a and 5b2 and the output bus bar 7a.

The second bus bars 5a2, 5b2 extend in parallel with the output bus bars 7a, 7b, The second bus bars 5a2, 5b2 are disposed so that the second module M2 of the first bridge B1 and the second module M2 of the second bridge B2 arranged side by side along the output bus bar 7b can be interposed between the second bus bars 5a2, 5b2 and the output bus bar 7b.

The first bus bars 5a1, 5b1 and the second bus bars 5a2, 5b2 are connected to an output portion (a positive electrode out+ and a negative electrode out− shown in FIG. 1) of the converter 3 respectively. In the illustrated example, the first bus bars 5a1, are connected to the output portion of the converter 3 through a pair of electric wires 23a, 23b. The second bus bars 5a2, 5b2 are connected to the output portion of the converter 3 through a pair of electric wires 24a, 24b.

Each of the first module M1 of the first bridge B1 and the first module M1 of the second bridge B2 has a positive electrode M1in+ and a negative electrode M1in− which constitute an input portion, and an output portion M1 out. The positive electrode M1in+ is connected to one end of the arm including the power semiconductor devices Q1, Q2. The negative electrode M1in− is connected to the other end of the arm including the power semiconductor devices Q1, Q2. In addition, the output portion M1 out is connected to a series connection point between the power semiconductor devices Q1, Q2 (see FIG. 1).

The input portion (the positive electrode M1in+ and the negative electrode M1in−) of the first module M1 interposed between the first bus bars 5a1 . . . 5b1 and the output bus bar 7a is provided in an end portion of the first module M1 along the first bus bars 5a1, 5b1 and connected to the first bus bars 5a1, 5b1. The output portion M1out of the first module M1 is provided on an opposite end portion of the first module M1 along the output bus bar 7a and connected to the output bus bar 7a.

Each of the second module M2 of the first bridge B1 and the second module M2 of the second bridge B2 has a positive electrode M2in+ and a negative electrode M2in− which constitute an input portion, and an output portion M2 out. The positive electrode M2in+ is connected to one end of the arm including the power semiconductor devices Q3, Q4. The negative electrode M2in− is connected to the other end of the arm including the power semiconductor devices Q3, Q4. In addition, the output portion M2 out is connected to a series connection point between the power semiconductor devices Q3, Q4 (see FIG. 1).

The input portion (the positive electrode M2in+ and the negative electrode M2in−) of the second module M2 interposed between the second bus bars 5a2, 5b2 and the output bus bar 7b is provided in an end portion of the second module M2 along the second bus bars 5a2, 5b2 and connected to the second bus bars 5a2, 5b2. The output portion M2 out of the second module M2 is provided on an opposite end portion of the second module M2 along the output bus bar 7b and connected to the output bus bar 7b.

Smoothed DC power from one of the capacitors connected to the first bus bars 5a1, 5b1 is supplied to a corresponding one of the first modules M1. Smoothed DC power from one of the capacitors connected to the second bus bars 5a2, 5b2 is supplied to a corresponding one of the second modules M2. The power semiconductor device Q1 of the first module M1 and the power semiconductor device Q4 of the second module M2 or the power semiconductor device Q2 of the first module M1 and the power semiconductor device Q3 of the second module M2 are turned. ON alternately. Thus, high frequency power is supplied from the first bridge B1 and the second bridge B2 to the heating coil 8 via the output section 7.

Here, high speed switching operation of the power semiconductor devices Q1 to Q4 suddenly changes a current flowing into the power semiconductor devices Q1 to Q4. The current change di/dt generates a surge voltage L×di/dt between the opposite ends of the power semiconductor devices Q1 to Q4 due to parasitic inductance L of an electrically conductive path between the power semiconductor devices Q1 to Q4 and the capacitors which are voltage sources.

The excessive surge voltage may damage the power semiconductor devices Q1 to Q4. In order to suppress such a surge voltage, the capacitors for the first bus bars 5a1, 5b1 are connected to the first bus bars 5a1, 5b1 not through electric wires etc., and the capacitors for the second bus bars 5a2, 5b2 are likewise connected to the second bus bars 5a2, 5b2 not through electric wires etc. When the electrically conductive paths are shortened in this manner, the parasitic inductance L can be reduced.

In the example of the invention, one capacitor is provided fix each module. That is, a capacitor C1-1 corresponding to the first module M1 of the first bridge B1, and a capacitor C1-2 corresponding to the first module M1 of the second bridge B2 are provided in the first bus bars 5a1, 5b1. The capacitor C1-1 is connected to a connection portion 13 between the first bus bars 5a1, 5b1 and the first module M1 of the first bridge B1. The capacitor C1-2 is connected to a connection portion 15 between the first bus bars 5a1, 5b1 and the first module M1 of the second bridge B2. Thus, the electrically conductive path between the capacitor C1-1 and the first module M1 of the first bridge B1 and the electrically conductive path between the capacitor C1-2 and the first module M1 of the second module B2 are shortened equally.

Similarly, a capacitor C2-1 corresponding to the second module M2 of the first bridge B1 and a capacitor C2-2 corresponding to the second module M2 of the second bridge B2 are provided in the second bus bars 5a2, 5b2. The capacitor C2-1 is connected to a connection portion 14 between the second bus bars 5a2, 5b2 and the second module M2 of the first bridge B1. The capacitor C2-2 is connected to a connection portion 16 between the second bus bars 5a2, 5b2 and the second module M2 of the second bridge B2. Thus, the electrically conductive path between the capacitor C2-1 and the second module M2 of the first bridge B1 and the electrically conductive path between the capacitor C2-2 and the second module M2 of the second bridge B2 are shortened equally.

In the aforementioned configuration, the smoothing section 5 is divided into the first bus bars 5a1, 5b1 for supplying electric power to the first module M1 of the first bridge B1 and the first module M1 of the second bridge B2, and the second bus bars 5a2, 5b2 for supplying electric power to the second module M2 of the first bridge B1 and the second module M2 of the second bridge B2. The first module M1 and the second module M2 are integrated and disposed between the first bus bars 5a1, 5b1 and the second bus bars 5a2, 5b2.

The first modules M1 may be disposed on one side of one pair of bus bars connected to the output portion of the converter 3 while the second modules M2 are disposed on the opposite side of the pair of bus bars so that electric power can be supplied to both the first modules M1 and the second modules M2 by the pair bus bars. In the case of this configuration, capacitors connected to the pair of bus bars have to be also disposed between the first modules M1 and the second modules M2.

When the capacitors connected to the pair of bus bars are disposed between the first modules M1 and the second modules M2, the first modules M1 and the second modules M2 are disposed separately from each other in a left/right direction with the interposition of the pair of bus bars and the capacitors therebetween. When the first modules M1 and the second modules M2 are otherwise designed to be disposed adjacently to each other, the capacitors have to be disposed to be superimposed on the first modules M1 or the second modules M2.

On the other hand, in the example of the invention, only the output bus bars 7a, b which are laminated on each other with the interposition of the sheet-like insulating member 7c between the plate faces of the output bus bars 7a, 7b are disposed between the first modules M1 and the second modules M2. Accordingly, the first modules M1 and the second modules M2 can be disposed adjacently to each other and the first modules M1 and the second modules M2 can be exposed respectively. Thus, maintenance of the inverter section 6 can be managed easily.

Further, in the example of the invention, the input portions (the positive electrodes M1in+ and the negative electrodes M1in−) of the first modules M1 disposed between the output: bus bar 7a in the center and the first bus bars 5a1, 5b1 are provided in the end portions of the first modules M1 along the first bus bars 5a1, 5b1 and the output portions M1 out of the first modules M1 are provided in the end portions of the first modules M1 along the output bus bar 7a. Accordingly, connection between the first bus bars 5a1, 5b1 and the first modules M1 and connection between the output bus bar 7a and the first modules M1 are simple so that maintenance of the inverter section 6 can be managed easily.

Similarly, the input portions (the positive electrodes M2in+ and the negative electrodes M2in−) of the second modules M2 disposed between the output bus bar 7b in the center and the second bus bars 5a2, 5b2 are provided in the end portions of the second modules M2 along the second bus bars 5a2, 5b2, and the output portions M2 out of the second modules M2 are provided in the end portions of the second modules M2 along the output bus bar 7b. Accordingly, connection between the second bus bars 5a2, 5b2 and the second modules M2 and connection between the output bus bar 7b and the second modules M2 are simple so that maintenance of the inverter section 6 can be managed easily.

Figure 4:
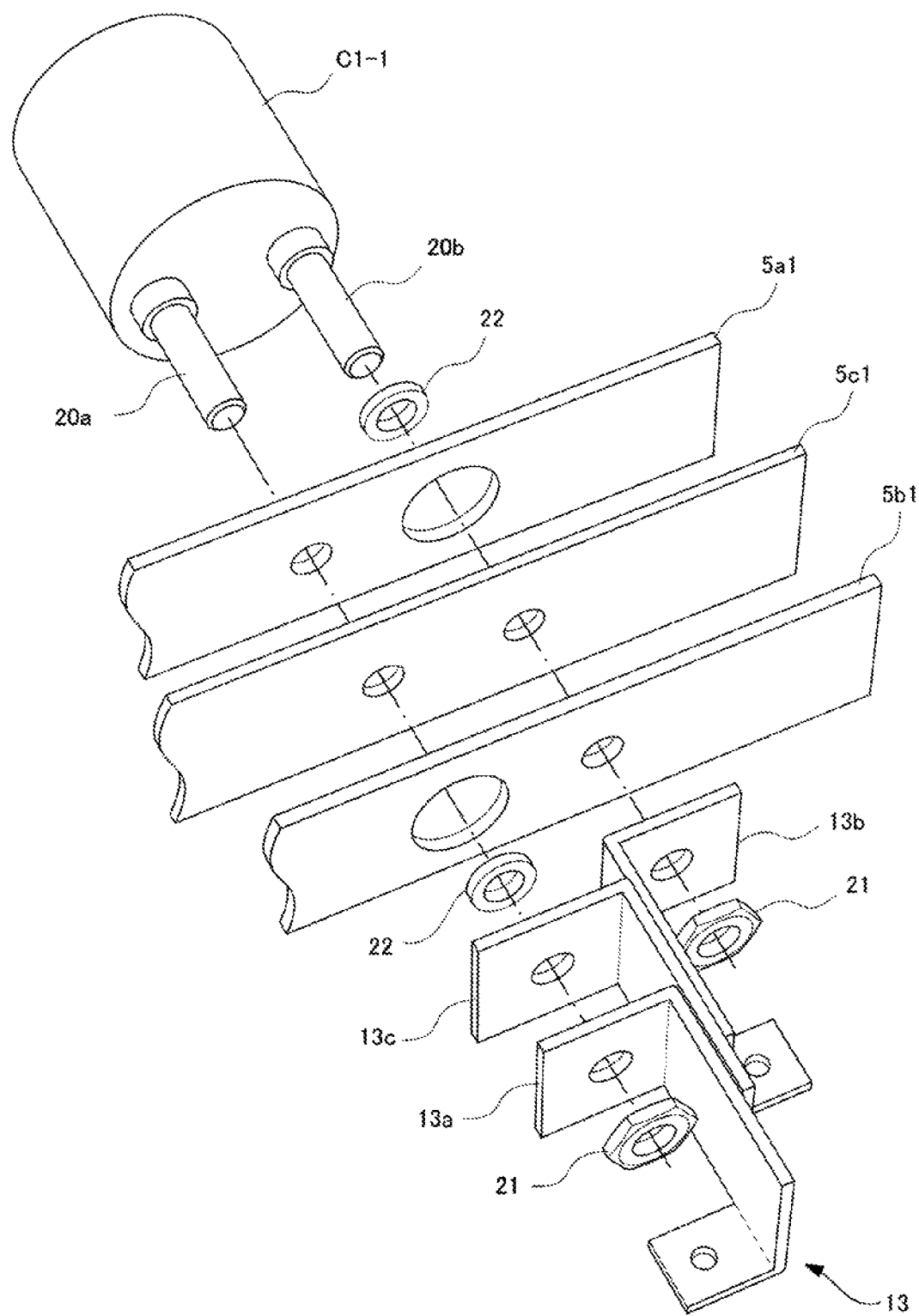
FIG. 4 is an exploded perspective view of the smoothing section.
Figure 5:
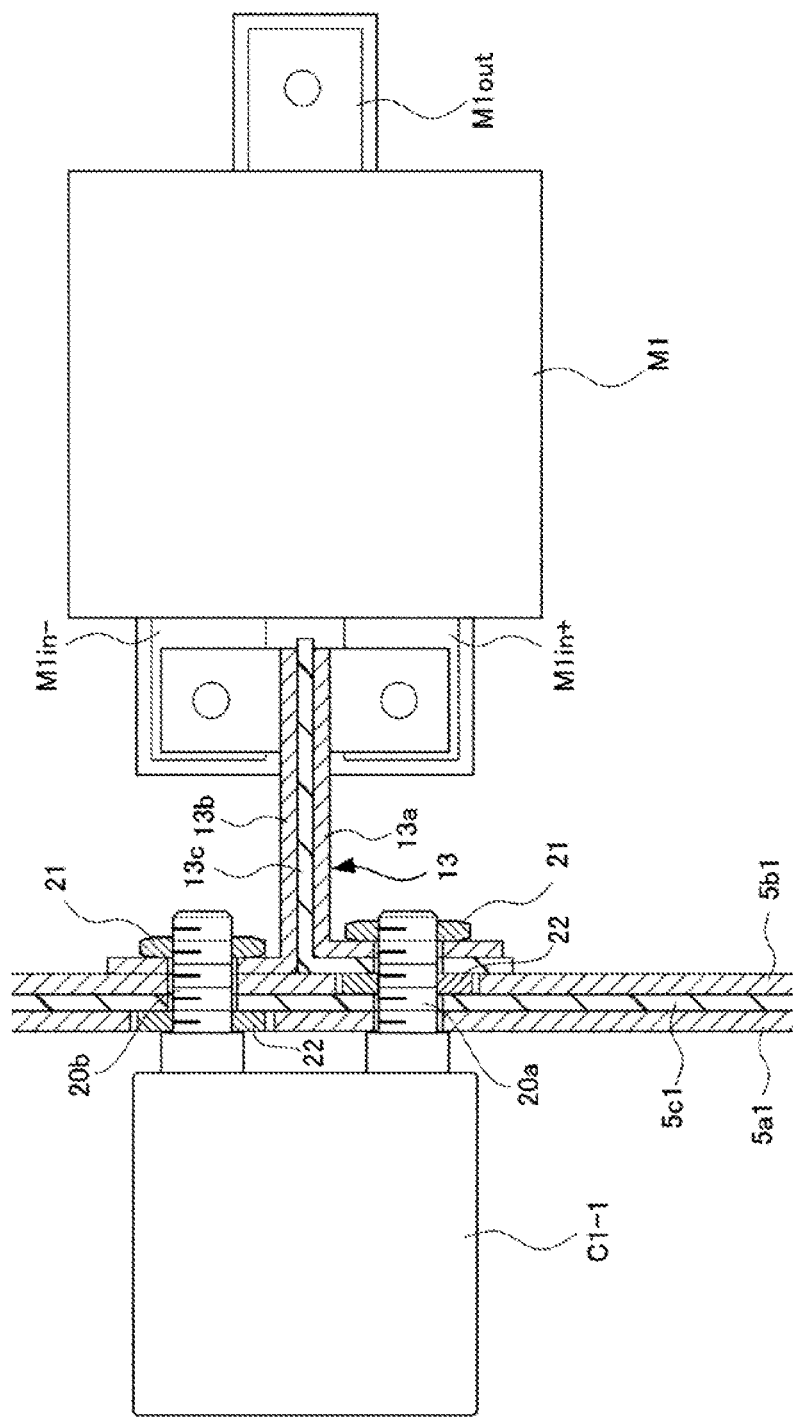
FIG. 5 is a sectional view of the smoothing section.

Next, a connection structure between the first module M1 of the first bridge B1 connected to the first bus bars 5a1, 5b1 and the capacitor C1-1 will be described below by way of example with reference to FIGS. 4 and 5.

In the example of the invention, each of the first bus bars 5a1, 5b1 consists of a flat plate-like electrically conducting member. The first bus bars 5a1, 5b1 are laminated on each other with the interposition of a sheet-like insulating member 5c1 therebetween, so that, of a pair of flat plate faces and a pair of flat side faces constituting outer surfaces of the first bus bars 5a1, 5b1 along an electric conduction direction (longitudinal direction), the plate faces relatively large in dimension in a direction (width direction) perpendicular to the electric conduction direction within the plate faces can be apposed to each other. The connection portion 13 between the first bus bars 5a1, 5b1 and the first module M1 of the first bridge B1 includes a pair of electrically conducting members 13a and 13b each shaped like a flat plate. The pair of electrically conducting members 13a and 13b are also laminated on each other with the interposition of a sheet-like insulating member 13c between plate faces of the electrically conducting members 13a and 13b.

With the interposition of the insulating member 13c between a base end portion of the electrically conducting member 13a and the first bus bar 5b1, the base end, portion of the electrically conducting member 13a is superimposed on the first bus bar 5b1 while maintaining non-conduction with the first bus bar 5b1. A base end portion of the electrically conducting member 13b is superimposed on the first bus bar 5b1 while attaining conduction with the first bus bar 5b1.

A pair of terminals 20a and 20b of the capacitor C1-1 are configured as screw terminals and provided side by side on a face of the capacitor C1-1. The pair of terminals 20a and 20b of the capacitor C1-1 are disposed to penetrate the first bus bar 5a1, the insulating member 5c1 and the first bus bar 5b1 in the named order respectively. A front end portion of the terminal 20a is disposed to further penetrate the insulating member 13c and the electrically conducting member 13a which are superimposed on the first bus bar 5b1. A front end portion of the terminal 20b is disposed to further penetrate the electrically conducting member 13b which is superimposed on the first bus bar 5b1.

The terminal 20a and the first bus bar 5b1 are insulated from each other by an insulating washer 22. On the other hand, a large-diameter flange portion formed in a base end portion of the terminal 20a makes contact with the first bus bar 5a1. In addition, a nut 21 threadedly engaged with the front end portion of the terminal 20a makes contact with the electrically conducting member 13a. Thus, the terminal 20a is connected to the first bus bar 5a1 and the electrically conducting member 13a.

The terminal 20b and a large-diameter flange portion formed in a base end portion of the terminal 20b are insulated from the first bus bar 5a1 by an insulating washer 22. On the other hand, a nut 21 threadedly engaged with the front end portion of the terminal 20b makes contact with the electrically conducting member 13b. Thus, the terminal 20b is connected to the electrically conducting member 13b and the first bus bar 5b1 which has attained conduction with the electrically conducting member 13b.

A front end portion of the electrically conducting member 13a is connected to the positive electrode M1in+ of the module M1 of the first bridge B1. A front end portion of the electrically conducting member 13b is connected to the negative electrode M1in− of the module M1 of the first bridge B1. Smoothed DC power from the capacitor C1-1 can be supplied to the module M1 of the first bridge B1.

Here, assume that the width of opposed faces of a pair of parallel flat-plate conductors, i.e. a dimension in a direction perpendicular to a direction in which each of the conductors extends (direction in which a current flows) is designated by a, and a distance between the opposed faces of the conductors is designated by b. Inductance of the pair of parallel flat-plate conductors is relevant to b/a. As the ratio b/a decreases, the inductance decreases. In a condition that the width a of the opposed faces is fixed, the inductance decreases as the distance h between the opposed faces decreases. In a condition that the distance b between the opposed faces is fixed, the inductance decreases as the width a of the opposed faces increases.

Figure 6:
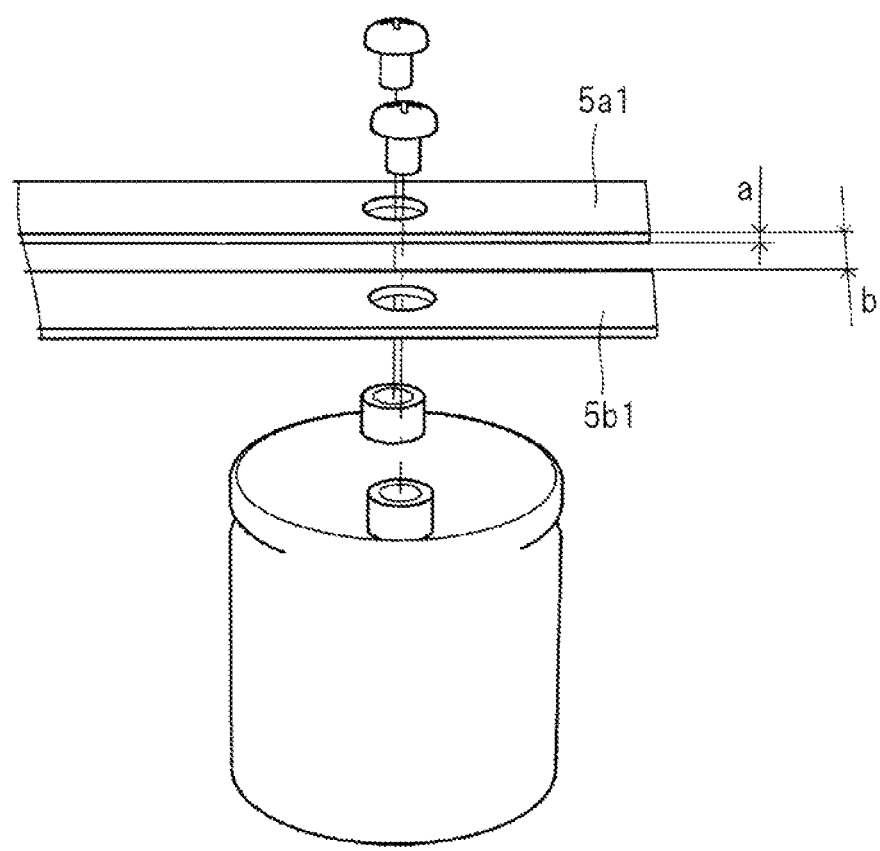
FIG. 6 is a perspective view of another example of the smoothing section.

Make a comparison with a case in which first bus bars 5a1, 5b1 are disposed so that side faces of the first bus bars 5a1, 5b1 can be opposed to each other, for example, as shown in FIG. 6. Since the first bus bars 5a1, 5b4 are laminated on each other with the interposition of the sheet-like insulating member 5c1 between the flat faces of the first bus bars 5a1, 5b1, the width of the opposed faces of the first bus bar 5a1, 5b1 can be increased and the inductance of the first bus bars 5a1, 5b1 can be reduced.

Figure 7:
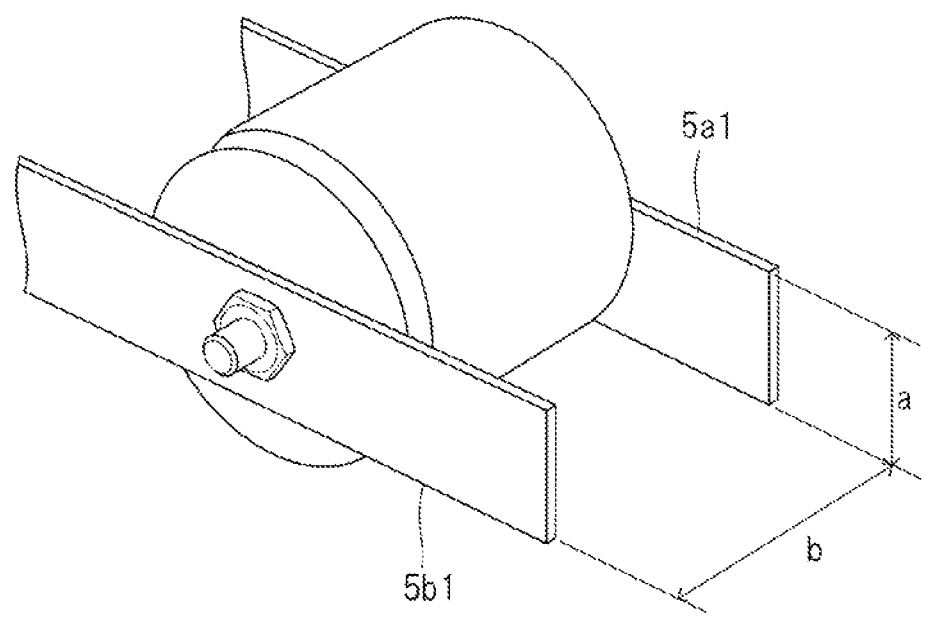
FIG. 7 is a perspective view of another example of the smoothing section.

Make another comparison with a case in which plate faces of first bus bars 5a1, 5b1 are opposed to each other, and the bus bars 5a1, 5b1 are disposed so that a capacitor provided with a pair of terminals at its opposite side faces can be interposed between the plate faces of the bus bars 5a1, 5b1, for example, as shown in FIG. 7. Since the first bus bars 5a1, 5b1 are laminated on each other with the interposition of the sheet-like insulating member 5c1 between the plate faces of the first bus bars 5a1, 5b1, the distance b between the opposed faces of the first bus bars 5a1, 5b1 can be reduced and inductance of the first bus bars 5a1, 5b1 can be reduced.

Thus, the first bus bars 5a1, 5b1 are laminated on each other with the interposition of the sheet-like insulating member 5c1 between the plate faces of the first bus bars 5a1, 5b1, and the electrically conducting members 13a and 13b of the connection portion 13 are laminated on each other with the interposition of the sheet-like insulating member 13c between the plate faces of the electrically conducting members 13a and 13b. In this manner, parasitic inductance of the electrically conductive path between the capacitor C1-1 and the module M1 of the first bridge B1 to which DC power is supplied from the capacitor C1-1 can be reduced so that a surge voltage can be suppressed from being generated between the opposite ends of the power semiconductor devices Q1 to Q4 due to the parasitic inductance. Thus, protection of the inverter section 6 can be enhanced.

Further, in the example of the invention in which the first bridge B1 and the second bridge B2 are provided in the inverter section 6, currents flowing into the first bridge B1 and the second bridge B2 respectively can be balanced to suppress concentration of a load on one of the bridges in order to enhance protection of the inverter section 6. The balance between the currents of the first bridge B1 and the second bridge B2 will be described below.

Figure 8:
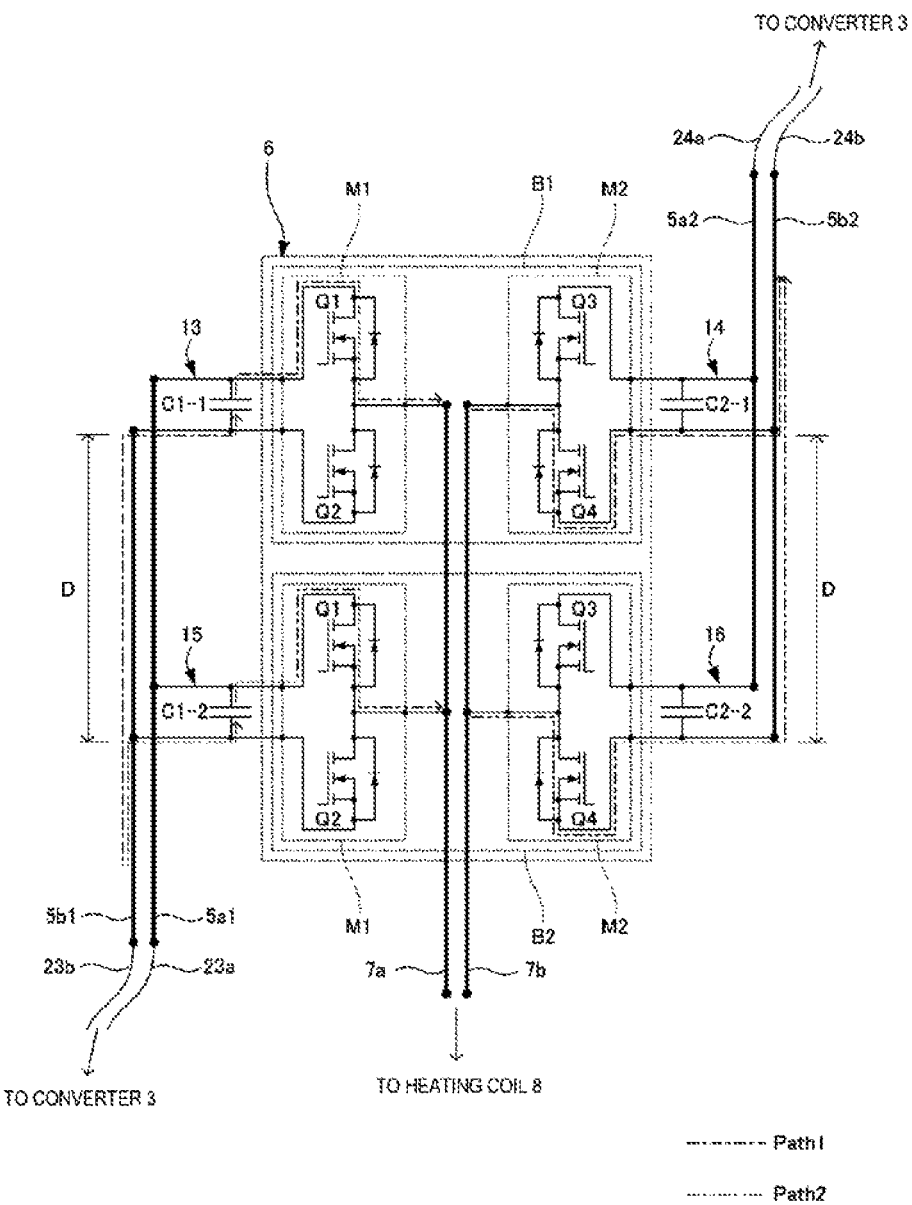
FIG. 8 is a circuit diagram illustrating current paths in the smoothing section, the inverter section and the output section of FIG. 3.

FIG. 8 illustrates paths of the currents flowing into the first bridge B1 and the second bridge B2 of the inverter section 6 respectively.

FIG. 8 illustrates a case where the power semiconductor device Q1 of the first module M1 and the power semiconductor device Q4 of the second module M2 in the first bridge B1 have been turned ON and the power semiconductor device Q1 of the first module M1 and the power semiconductor device Q4 of the second module M2 in the second bridge B2 have been turned ON. In this case, a current flowing into the first bridge B1 and a current flowing into the second bridge B2 flow in the following paths respectively.

<Current Path Path1 of First Bridge B1>

Capacitor C1-1→power semiconductor device Q1→load (output bus bar 7a→heating coil 8→output bus bar 7b)→power semiconductor device Q4→second bus bar 5b2→electric wire 24b→electric wire 23b→first bus bar 5b1→capacitor C1-1

<Current Path Path2 of Second Bridge B2>

Capacitor C1-2→power semiconductor device Q1→load (output bus bar 7a→heating coil 8→output bus bar 7b)→power semiconductor device Q4→second bus bar 5b2→electric wire 24b→electric wire 23b→first bus bar 5b1→capacitor C1-2

Also refer to FIG. 3. The electric wires 23a, 23b connecting the first bus bars 5a1, 5b1 of the smoothing section 5 and the output portion of the converter 3 to each other are connected to end portions of the first bus bars 5a1, 5b1 on one side in an extension direction of the output bus bras 7a, 7b, i.e. to the first module M1-side end portion of the second bridge B2. The electric wires 24a, 24h connecting the second bus bars 5a2, 5b2 of the smoothing section 5 and the output portion of the converter 3 to each other are connected to end portions of the second bus bars 5a2, 5b2 on the other side in the extension direction of the output bus bars 7a, 7b, i.e. to the second module M2-side end portion of the first bridge B1.

When electrically conductive path lengths of the current paths Path1 and Path2 in the second bus bar 5b2 are compared with each other in this case, the current path Path2 is longer by a distance D between the connection portion 14 between the second bus bars 5a2, 5b2 and one second module M2 and the connection portion 16 between the second bus bars 5a2, 5b2 and the other second module M2. On the other hand, when electrically conductive path lengths of the current paths Path1 and Path2 in the first bus bar 5b1 are compared with each other, the current path Path1 is longer by a distance D between the connection portion 13 between the first bus bars 5a1, 5b1 and one first module M1 and the connection portion 15 between the first bus bars 5a1, 5b1 and the other first module M1.

Therefore, the difference between the electrically conductive path lengths in the second bus bar 5b2 and the difference between the electrically conductive path lengths in the first bus bar 5b1 are cancelled each other. Therefore, the total electrically conductive path lengths of the current paths Path1 and Path2 are made equal to each other.

Figure 9:
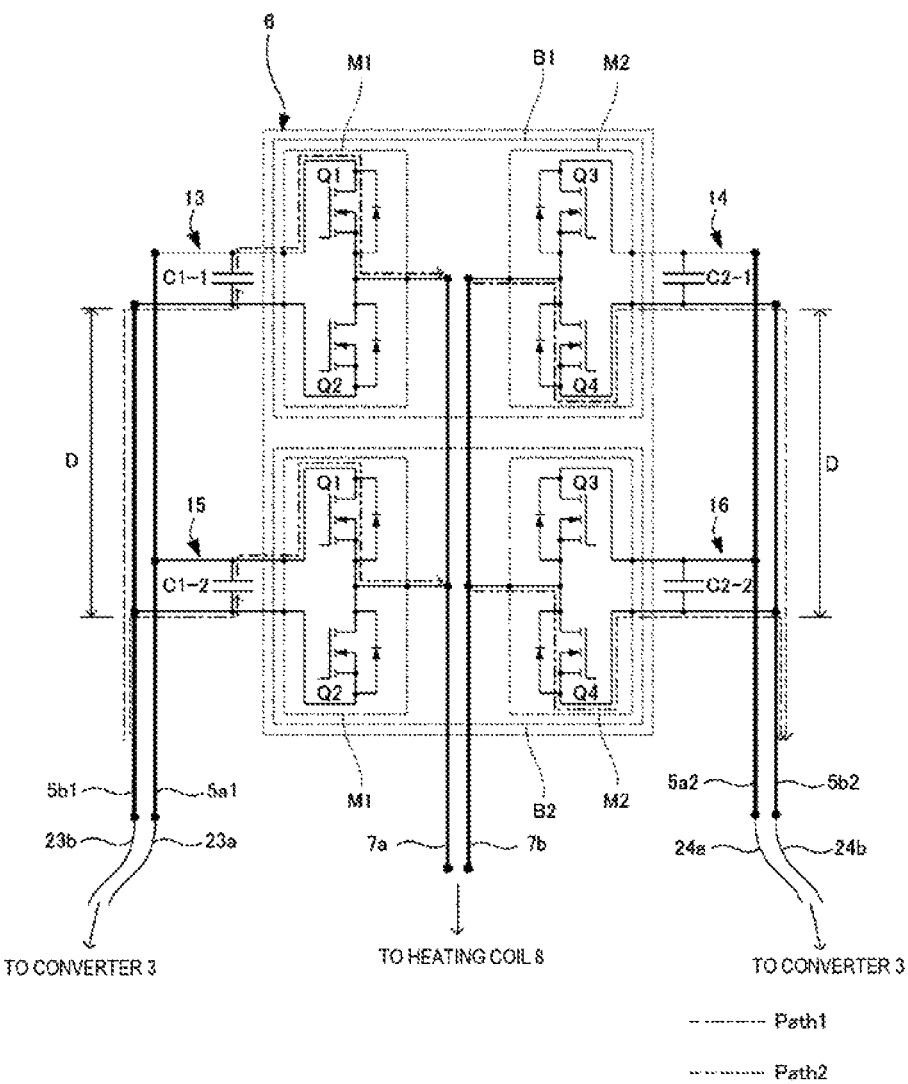
FIG. 9 is a circuit diagram illustrating current paths according to another configuration example of the smoothing section, the inverter section and the output section.

On the other hand, assume that the electric wires 23a, 23b are connected to the first module M1-side end portion of the second bridge B2, and the electric wires 24a, 24b are likewise connected to the second module M2-side end portion of the second bridge B2, as shown in FIG. 9. When electrically conductive path lengths of current paths Path1 and Path2 are compared with each other in this case, the current path Path1 is longer by a distance D in each of the first bus bar 5b1 and the second bus bar 5b2. The total electrically conductive path length of the current path Path1 is longer than the total electrically conductive path length of the current path Path2.

Figure 11:
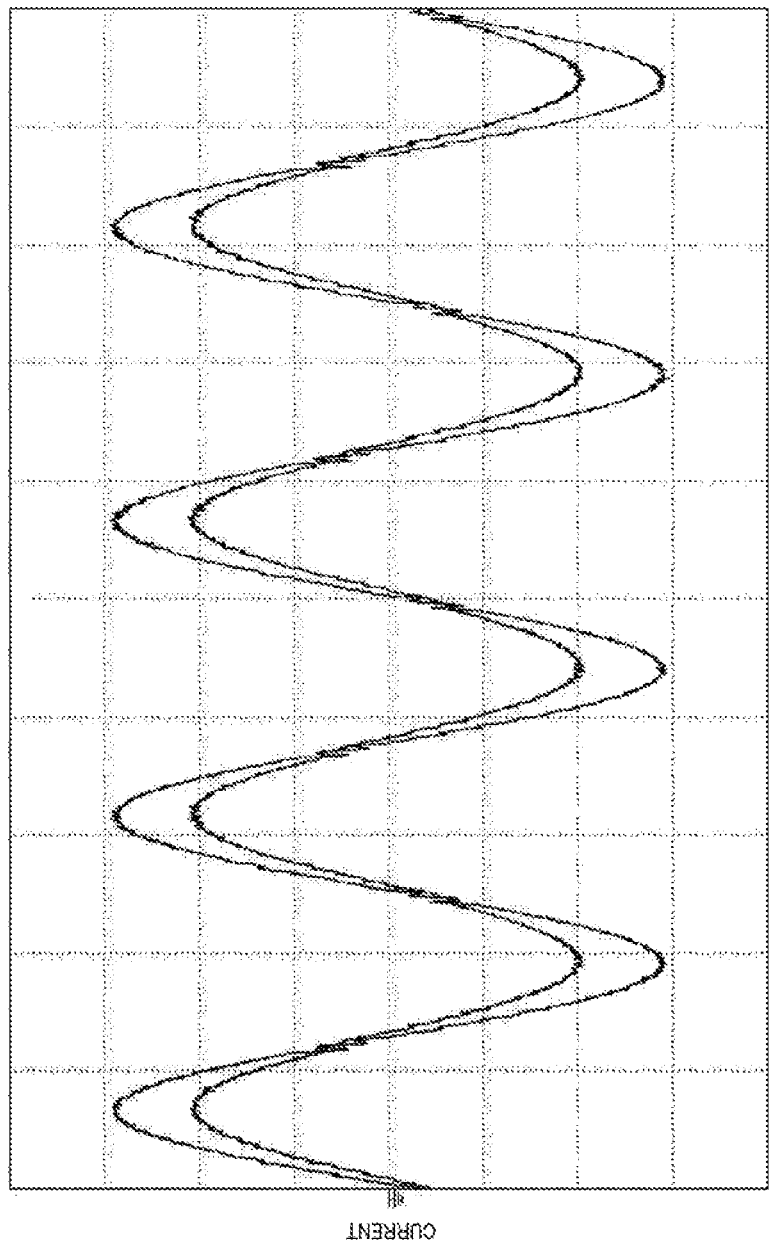
FIG. 11 is a graph showing waveforms of currents flowing into bridges of the inverter section in the current paths of FIG. 9.

When a difference between the electrically conductive path lengths of the current paths Path1 and Path2 is generated, a difference between inductances of the current paths Path1 and Path2 is generated due to the difference between the electrically conductive path lengths. Therefore, the inductance of the current path Path2 relatively shorter in electrically conductive path length is smaller. As a result, the balance between a current flowing into the first bridge B1 and a current flowing into the second bridge B2 is lost, as shown in FIG. 11.

Figure 10:
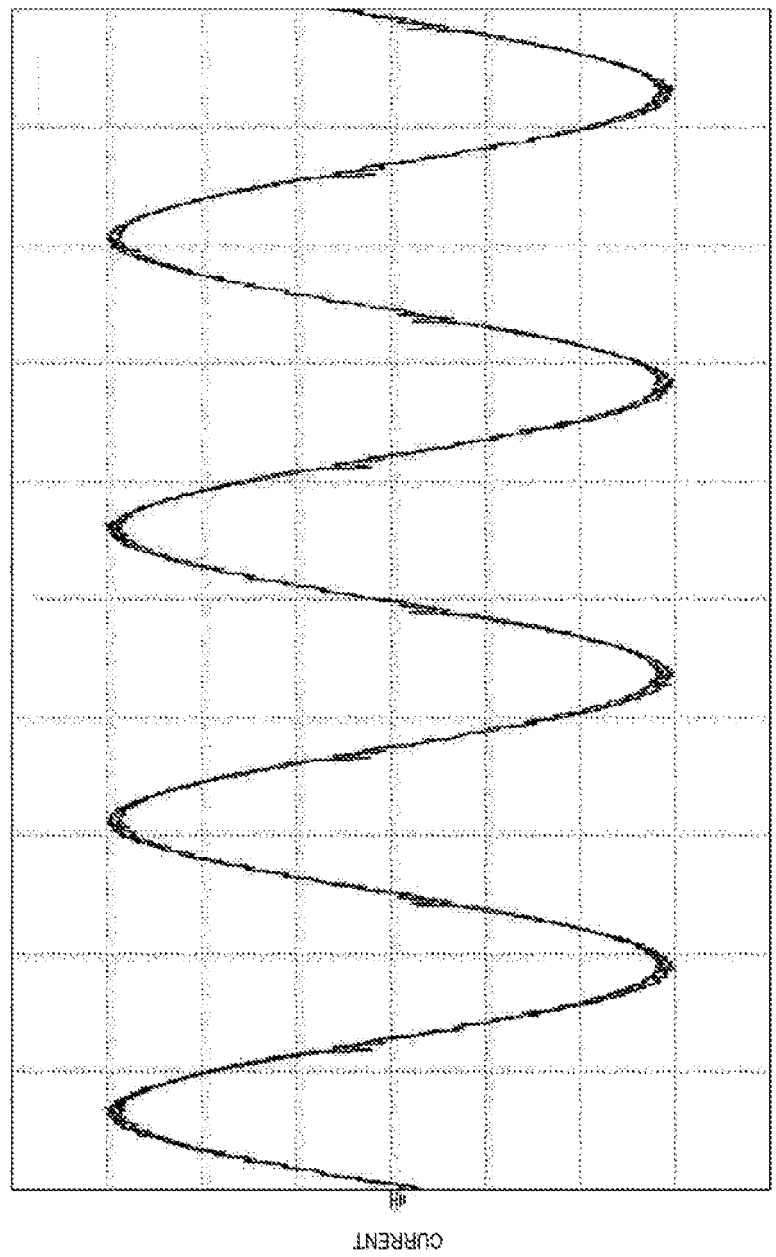
FIG. 10 is a graph showing waveforms of currents flowing into bridges of the inverter section in the current paths of FIG. 8.

Input portions of the first bus bars 5a1, 5b1 to which the electric wires 23a, 23b are connected are provided at the end portions of the first bus bars 5a1, 5b1 on one side in the extension direction of the output bus bars 7a, 7b. Input portions of the second bus bars 5a2, 5b2 to which the electric wires 24a, 24h are connected are provided at the end portions of the second bus bars 5a2, 5b2 on the other side in the extension direction of the output bus bars 7a, 7b. The electrically conductive path lengths of the current paths Path1 and Path2 are made equal to each other. In this manner, the current flowing into the first bridge B1 and the current flowing into the second bridge B2 can be balanced, as shown in FIG. 10. Accordingly, the load can be suppressed from being concentrated on one of the bridges so that protection of the inverter section 6 can be enhanced.

Figure 12:
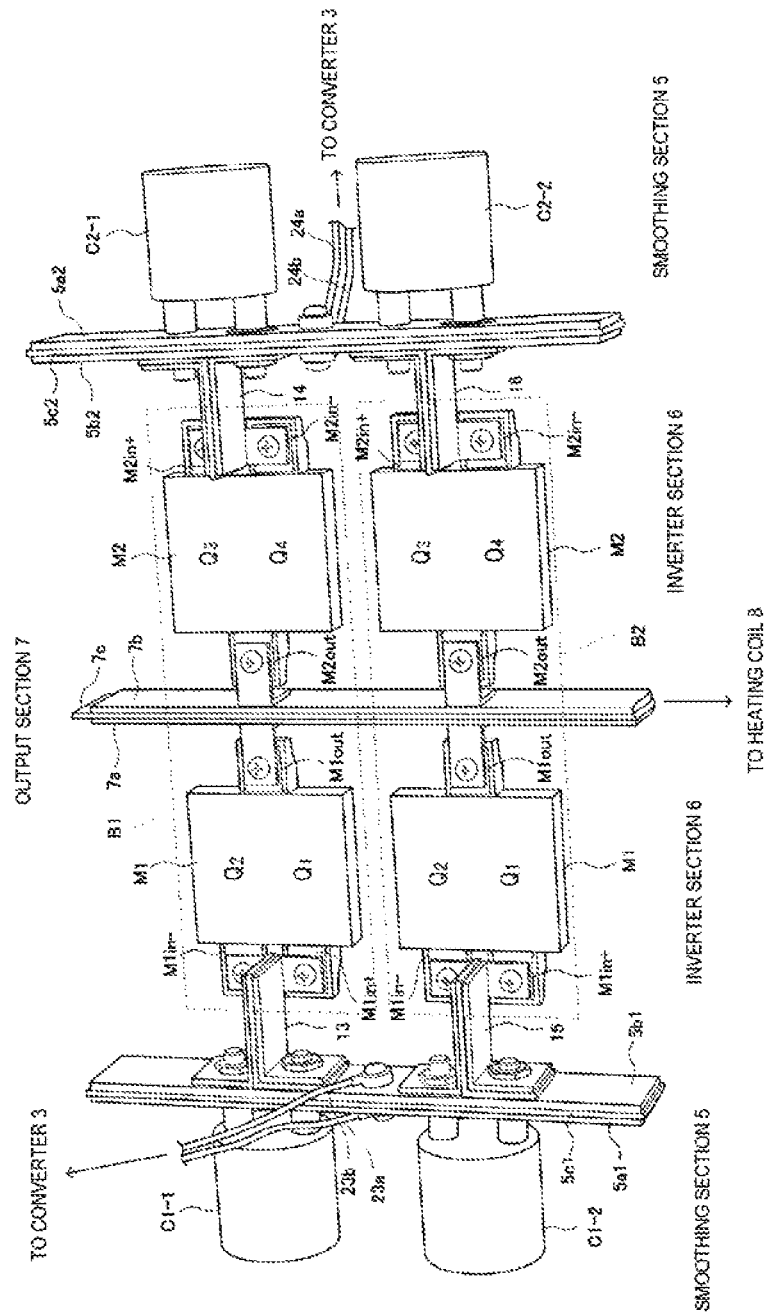
FIG. 12 is a perspective view of another configuration example of the smoothing section, the inverter section and the output section.
Figure 13:
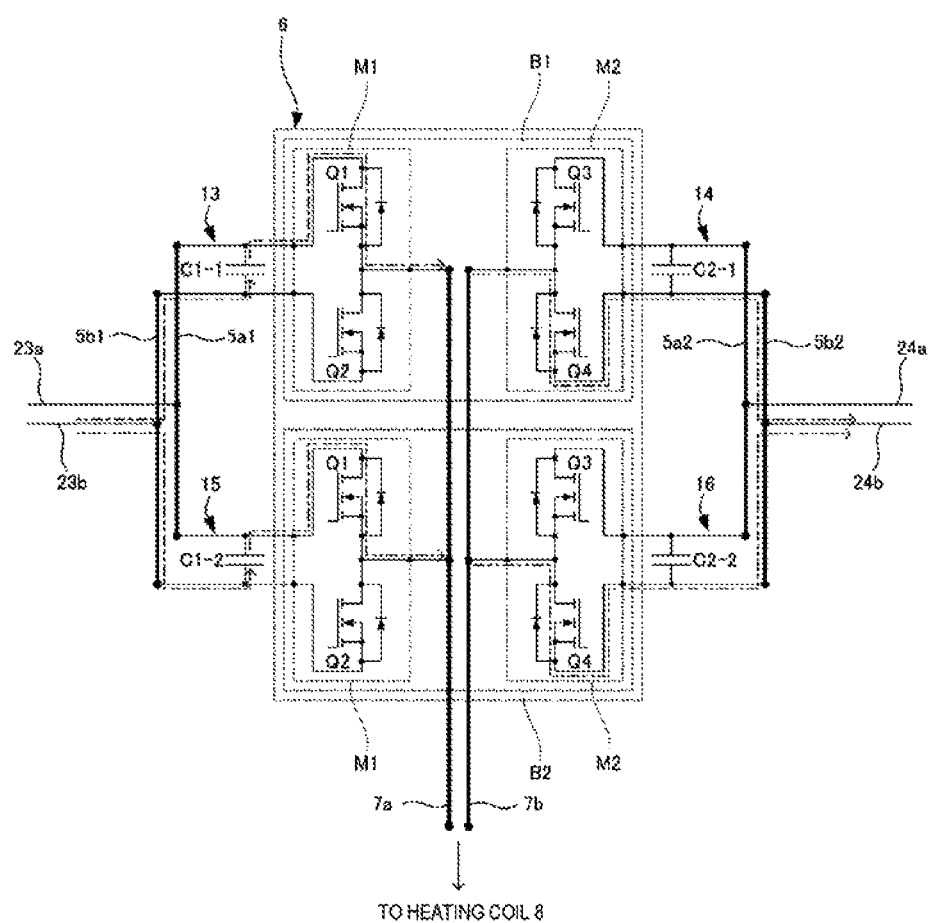
FIG. 13 is a circuit diagram illustrating current paths in the smoothing section, the inverter section and the output section of FIG. 12.

Incidentally, when the inverter section 6 is constituted by two bridges, i.e. the first bridge B1 and the second bridge B2, the input portions of the first bus bars 5a1, 5b1 to which the electric wires 23a, 23b are connected may be provided between the connection portion 13 to the first module M1 and the connection portion 15 to the first module M1, and the input portions of the second bus bars 5a2, 5b2 to which the electric wires 24a, 24b are connected may be provided between the connection portion 14 to the second module M2 and the connection portion 16 to the second module M2, as shown in FIGS. 12 and 13.

Also in this case, an electrically conducive path length of a current path Path1 of the first bridge B1 and an electrically conductive path length of a current path Path2 of the second bridge B2 are made equal to each other. Accordingly, a current flowing into the first bridge B1 and a current flowing into the second bridge B2 can be balanced so that protection of the inverter section 6 can be enhanced.

Preferably, the input portions of the first bus bars 5a1, 5b1 are provided at their central portions at which the distance between the connection portions 13, 15 is equally divided, and the input portions of the second bus bars 5a2, 5b2 are provided at their central portions at which the distance between the connection portions 14, 16 is equally divided. In this case, the electrically conductive path length of the current path Path1 of the first bridge B1 and the electrically conductive path length of the current path Path2 of the second bridge B2 are made more equally so that protection of the inverter section 6 can be enhanced more greatly.

The balance between the current flowing into the first bridge B1 and the current flowing into the second bridge B2 in the case where the inverter section 6 is constituted by two bridges, i.e. the first bridge B1 and the second bridge B2 has been described so far. However, currents flowing into three or more bridges respectively can be balanced even in a case where the bridges are provided in the inverter section 6.

Figure 14:
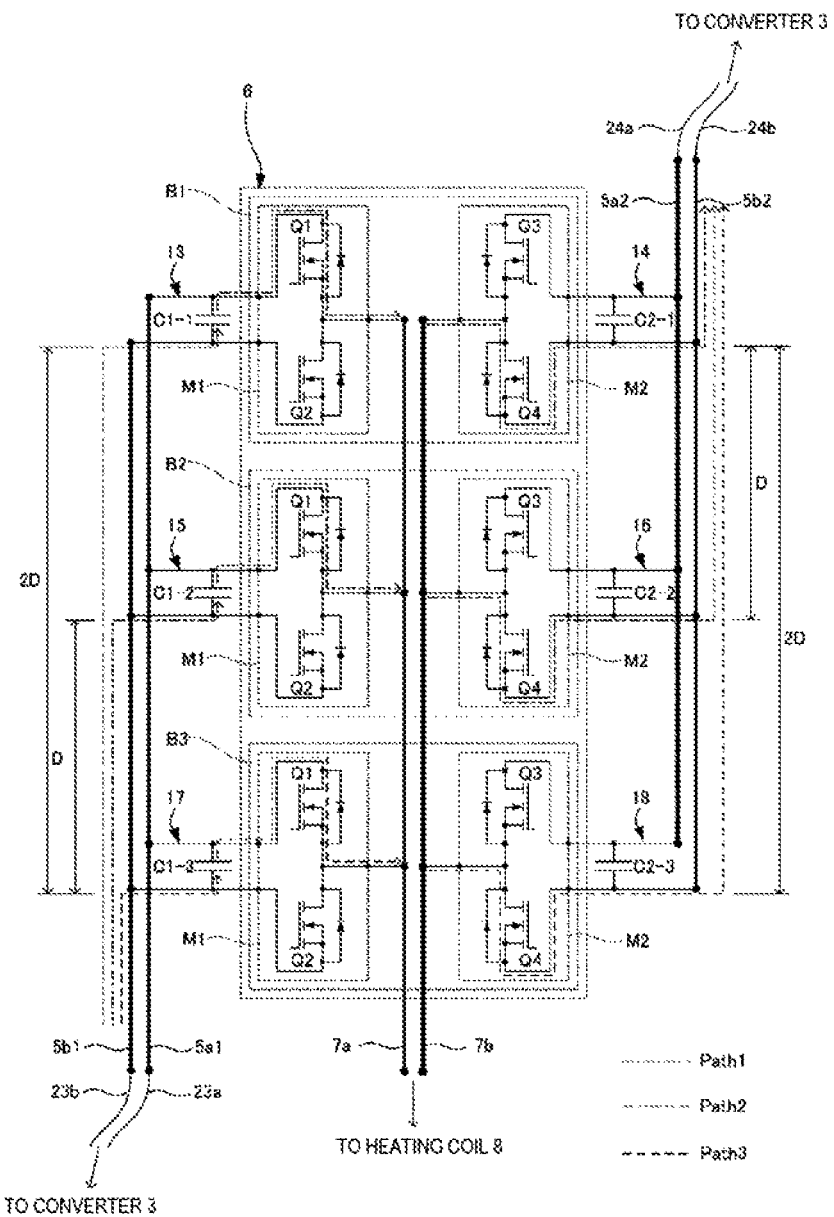
FIG. 14 is a circuit diagram showing current paths in another configuration example of the smoothing section, the inverter section and the output section.

In an example shown in FIG. 14, a third bridge B3 is provided additionally to a first bridge B1 and a second bridge B2.

A first module M1 of the first bridge B1, a first module M1 of the second bridge B2 and a first module M1 of the third bridge B3 are disposed to be arranged side by side along an output bus bar 7a. The first module M1 of the third bridge B3 is connected to first bus bars 5a1, 5b1 through a connection portion 17. A capacitor C1-3 corresponding to the first module M1 of the third bridge B3 is directly connected to the connection portion 17. In addition, a second module M2 of the first bridge B1, a second module M2 of the second bridge B2 and a second module M2 of the third bridge B3 are disposed to be arranged side by side along an output bus bar 7b. The second module M2 of the third bridge B3 is connected to second bus bars 5a2, 5b2 through a connection portion 18. A capacitor C2-3 corresponding to the second module M2 of the third bridge B3 is directly connected to the connection portion 18.

Electric wires 23a, 23b connecting the first bus bars 5a1, 5b1 and an output portion of a converter 3 to each other are connected to end portions of the first bus bars 5a1, 5b1 on one side in an extension direction of the output bus bars 7a, 7b, i.e. to a first module M1 side end portion of the third bridge B3. Electric wires 24a, 24b connecting second bus bars 5a2, 5b2 and the output portion of the converter 3 to each other are connected to end portions of the second bus bars 5a2, 5b2 on the other side in the extension direction of the output bus bars 7a, 7b, i.e. to a second module M2-side end portion of the first bridge B1.

When electrically conductive path lengths of current paths Path1, Path2 and Path3 in the second bus bar 5b2 are compared with one another, the current path Path2 is longer than the current path Path1 by a distance D between a connection portion 14 and a connection portion 16, and the current path Path3 is longer than the current path Path1 by a distance 2D between the connection portion 14 and the connection portion 18. On, the other hand, when electrically conductive path lengths of the current paths Path1, Path2 and Path3 in the first bus bar 5b1 are compared with one another, the current path Path2 is longer than the current path Path3 by a distance D between a connection portion 15 and the connection portion 17, and the current path Path1 is longer than the current path Path3 by a distance 2D between a connection portion 13 and the connection portion 17.

Therefore, the difference among the electrically conductive path lengths in the second bus bar 5b2 and the difference among the electrically conductive path lengths in the first bus bar 5a1 are cancelled each other. Therefore, the total electrically conductive path lengths of the current paths Path1, Path2 and Path3 are made equal to one another. Thus, currents flowing into the first bridge B1, the second bridge B2 and the third bridge B3 respectively can be balanced.

Incidentally, one capacitor is connected to each of the connection portions 13, 14, 15, 16, 17, 18 as described above. However, a plurality of capacitors may be connected in parallel with each of the connection portions.

In addition, each of the first bus bars 5a1, 5b1, the second bus bars 5a2, 5b2, and a pair of electrically conducting members of each of the connection portions 13, 14, 15, 16, 17, 18 is formed into a flat plate shape, i.e. a rectangular shape in a section perpendicular to the electric conduction direction, as described above. However, the invention is not limited thereto. For example, each of the first bus bars 5a1, 5b1, the second bus bars 5a2, 5b2, and the pair of electrically conducting members of each of the connection portions 13, 14, 15, 16, 17, 18 may be formed into a semicircular shape in the section perpendicular to the electric conduction direction. In this case, an outer surface of the semicircular shape along the electric conduction direction may be constituted by a flat face including the diameter in the section and a semicircular cylindrical face including an arc in the section. The flat faces of the paired semicircular shapes may be opposed to each other and laminated on each other with the interposition of an insulating member therebetween.

This application is based on Japanese Patent Application No. 2015-251890 filed on Dec. 24, 2015, the entire content of which is incorporated herein by reference.

The invention claimed is:

1. An induction heating power supply apparatus comprising:
a smoothing section configured to smooth a pulsating current of DC power that has been output from a DC power supply section;
an inverter section configured to convert the DC power smoothed by the smoothing section into AC power; and
an output section configured to output the AC power into which the DC power has been converted by the inverter section,
wherein the output section comprises a pair of output bus bars,
wherein the inverter section comprises at least one bridge, the bridge comprising a first module and a second module, each of the first module and the second module comprising two switching devices connected to each other in series,
wherein the pair of output bus bars is interposed between the first module and the second module of the bridge such that an output portion of the first module is connected to one of the output bus bars and an output portion of the second module is connected to another of the output bus bars,
wherein the smoothing section comprises a pair of first bus bars connected to an output portion of the DC power supply section and an input portion of the first module, at least one capacitor connected to the pair of first bus bars, a pair of second bus bars connected to the output portion of the DC power supply section and an input portion of the second module, and at least one capacitor connected to the pair of second bus bars,
wherein the pair of first bus bars extends in parallel with the pair of output bus bars and is disposed such that the first module is interposed between the pair of first bus bars and the pair of output bus bars,
wherein the pair of second bus bars extends in parallel with the pair of output bus bars and is disposed such that the second module is interposed between the pair of second bus bars and the pair of output bus bars,
wherein the inverter section comprises two of the bridges,
wherein the first modules of the bridges are arranged side by side along the pair of first bus bars, each of the first modules being connected to the pair of first bus bars through a connection portion provided for each of the first modules,
wherein the second modules of the bridges are arranged side by side along the pair of second bus bars, each of the second modules being connected to the pair of second bus bars through a connection portion provided for each of the second modules,
wherein the smoothing section comprises two capacitors provided for each of the first modules, each of the capacitors being connected to the connection portion provided for a corresponding one of the first modules, and two capacitors provided for each of the second modules, each of the capacitors provided for each of the second modules being connected to the connection portion provided for a corresponding one of the second modules,
wherein an input portion of the pair of first bus bars to be connected to the output portion of the DC power supply section is provided between the connection portions provided for the first modules, and
wherein an input portion of the pair of second bus bars to be connected to the output portion of the DC power supply section is provided between the connection portions provided for the second modules.

2. The induction heating power supply apparatus according to claim 1, wherein
the input portion of the pair of first bus bars is provided at a central portion of the pair of first bus bars at which a distance between the connection portions provided for the first modules is equally divided, and
the input portion of the pair of second bus bars is provided at a central portion of the pair of second bus bars at which a distance between the connection portions provided for the second modules is equally divided.

3. An induction heating power supply apparatus comprising:
a smoothing section configured to smooth a pulsating current of DC power that has been output from a DC power supply section;
an inverter section configured to convert the DC power smoothed by the smoothing section into AC power; and
an output section configured to output the AC power into which the DC power has been converted by the inverter section,
wherein the output section comprises a pair of output bus bars,
wherein the inverter section comprises at least one bridge, the bridge comprising a first module and a second module, each of the first module and the second module comprising two switching devices connected to each other in series,
wherein the pair of output bus bars is interposed between the first module and the second module of the bridge such that an output portion of the first module is connected to one of the output bus bars and an output portion of the second module is connected to another of the output bus bars,
wherein the smoothing section comprises a pair of first bus bars connected to an output portion of the DC power supply section and an input portion of the first module, at least one capacitor connected to the pair of first bus bars, a pair of second bus bars connected to the output portion of the DC power supply section and an input portion of the second module, and at least one capacitor connected to the pair of second bus bars,
wherein the pair of first bus bars extends in parallel with the pair of output bus bars and is disposed such that the first module is interposed between the pair of first bus bars and the pair of output bus bars,
wherein the pair of second bus bars extends in parallel with the pair of output bus bars and is disposed such that the second module is interposed between the pair of second bus bars and the pair of output bus bars,
wherein each of the first module and the second module comprises a module body on which the switching devices are mounted, and a driver board configured to drive the switching devices, and
wherein the driver board is overlaid on the module body with a shielding plate being interposed therebetween.

* * * * *